United States Patent [19]

Winter

[11] Patent Number: 4,613,492
[45] Date of Patent: Sep. 23, 1986

[54] PRODUCTION OF SYNTHESIS GAS
[75] Inventor: Christopher L. Winter, Great Bookham, England
[73] Assignee: Humphreys & Glasgow, Ltd., Great Bookham, United Kingdom
[21] Appl. No.: 782,390
[22] Filed: Oct. 1, 1985

Related U.S. Application Data

[63] Continuation of Ser. No. 528,640, Sep. 1, 1983, abandoned.

[30] Foreign Application Priority Data

Sep. 1, 1982 [GB] United Kingdom ................ 8224946

[51] Int. Cl.$^4$ .......................... C01B 2/02; C01B 2/30; C01C 1/04
[52] U.S. Cl. ................................... 423/359; 252/374; 252/375; 252/376
[58] Field of Search ................ 423/359; 252/374, 375, 252/376

[56] References Cited
U.S. PATENT DOCUMENTS
4,296,085 10/1981 Banquy .............................. 252/373

Primary Examiner—John Doll
Assistant Examiner—Wayne A. Langel
Attorney, Agent, or Firm—Mawhinney & Mawhinney & Connors

[57] ABSTRACT

A process for the production of ammonia wherein excess nitrogen is fed to the secondary reformer and a cryogenic unit is employed to obtain a nitrogen-rich stream which is recycled at least in part to the cryogenic unit.

4 Claims, 1 Drawing Figure

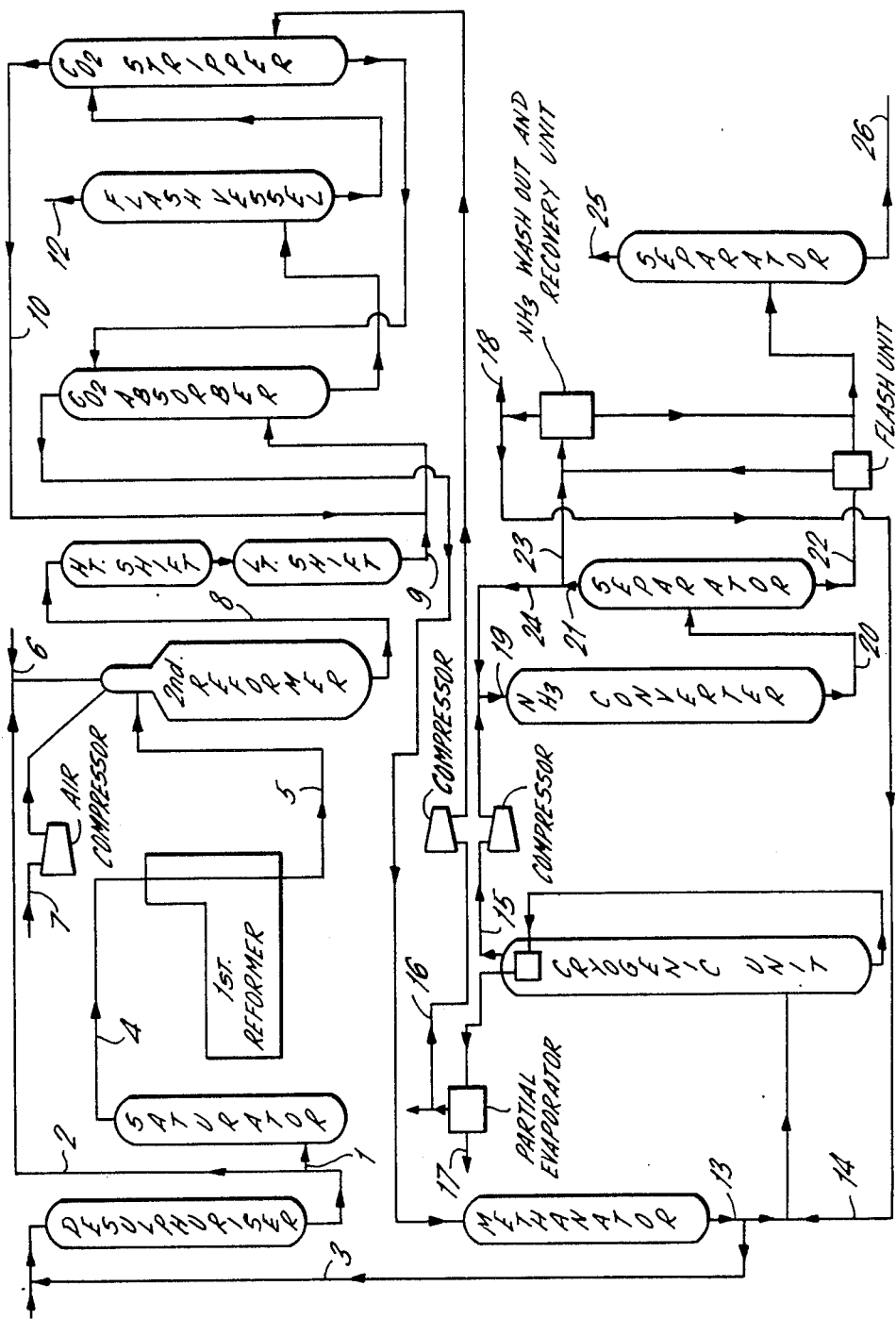

PRODUCTION OF SYNTHESIS GAS

This is a continuation of application Ser. No. 528,640, filed Sept. 1, 1983, abandoned.

This invention relates to a process for the reforming of a hydrocarbon-containing gas by means of steam-reforming and reforming by direct oxidation of some of the gas with air to produce, after further processing, a synthesis gas such as may be used to synthesise ammonia, or hydrogen.

In the current state of the art the compressed hydrocarbon-containing gas (hereafter called feed) is mixed with some recycled gas which contains hydrogen, desulphurised, mixed further with an excess of steam, heated, and then passed through a tube containing catalyst. The tube is located in a fired heater (hereafter called primary reformer). In the tube, some steam and feed react to produce carbon monoxide and hydrogen. Some carbon monoxide reacts further with steam to produce carbon dioxide and more hydrogen.

If the synthesis gas is for ammonia production, the gases leaving the tubes of the primary reformer next enter a vessel called the secondary reformer where the gases are reacted with preheated, compressed air. The energy released causes the temperature of the gases to rise. The gases then flow through a bed of catalyst during which most of the remaining feed reacts with steam. The resulting gaseous mixture contains carbon monoxide, carbon dioxide, hydrogen, nitrogen, argon, and a considerable amount of unreacted steam.

After cooling the gases in a steam raising boiler, most of the carbon monoxide is reacted with some of the excess steam (the shift reaction) to form additional carbon dioxide and hydrogen. Next, the carbon dioxide is removed to a low level and then even this low level, along with the residual carbon monoxide, is reacted with hydrogen to form methane and water. The water is removed because oxygen compounds are ammonia catalyst poisons.

After compression, the synthesis gas is passed to an ammonia synthesis loop from where the methane and argon, contained in the synthesis gas, have to be purged to prevent their concentrations reducing ammonia production.

The primary reformer is very expensive to build and operate, and the cost of raising steam to mix with the feed and to power equipment such as the air compressor is likewise expensive in both capital and operating costs.

One of the objects of the invention described herein is to reduce the capital and fuel costs of the primary reformer and to significantly reduce the amount of steam needed to operate the plant.

If the amount of steam mixed with the feed is slightly reduced, the amount of feed unreacted increases. This can result in a larger flow of purge gas from the loop. If the steam is further reduced carbon may be formed which is deposited on the catalyst in the primary reformer.

An important part of the present invention is to split the flow of feed after desulphurisation and before mixing it with steam, to bypass some of the feed around the primary reformer and to feed it, after desulphurisation and heating, directly to the secondary reformer(s) although a comparatively small amount of steam may be added to the bypassed feed to stablize it during heating—a maximum steam:carbon ratio in the bypassed feed being of 1.5:1.

The economic amount of feed to bypass is a function of many factors, e.g. the cost of feed, the steam requirements of the process and machinery and the composition of the feed—particularly its nitrogen content.

The amount of nitrogen, and hence air, added to the secondary reformer is dependent on many factors, e.g. the end use of the gas and the nitrogen content of the feed. An oxygen containing gas may be used in place of air.

In the case of ammonia production, the amount of nitrogen reacting with hydrogen in the synthesis loop is normally stated to be the stoichiometric amount of nitrogen. Using this nomenclature, the amount of nitrogen fed to the secondary reformer as air can be less than or greater than the stoichiometric amount. In some processes an amount in excess of the stoichiometric is added because, in effect, the part of the feed that may be considered as having reacted with the oxygen may also be considered as fuel burnt at 100% efficiency on its higher calorific value rather than, say 90% efficiency on its lower calorific value in the primary reformer.

According to the present invention, the gases leaving the secondary reformer usually contain a higher than usual concentration of unreacted feed, although substantially the majority of the feed will have reacted. If the end use of the gas is to produced ammonia, the gases leaving the boiler are passed to a high temperature shift reactor where carbon monoxide is reacted to form carbon dioxide and additional hydrogen. This would usually be followed, after cooling, by a low temperature shift rector. In the shift section, water may be injected into the gas stream in order to make more carbon monoxide react.

Next, according to the present invention, carbon dioxide is removed from the gas stream to a low concentration. This may be effected by either a physical solvent system or a chemically reactive solvent system such as 'Benfield'.

For ammonia, it is not necessary to reduce the carbon dioxide concentrations to as low a level as conventional designs use, because of methane removal prior to the loop.

Next, for ammonia, the gases may pass to a methanation reactor where residual carbon monoxide and carbon dioxide react with hydrogen to reform methane and water, after which the gas may be compressed and passed through a drier.

Alternatively, in the present invention, the gases from the high temperature shift reactor may pass through a low temperature shift reactor, through a carbon dioxide removal section which may leave a comparatively high concentration of carbon dioxide in the gases and then, possibly after compression, may pass to a molecular sieve adsorption unit to remove more carbon dioxide and water.

For ammonia, whether the gas is methanated or is passed through a bed of molecular sieve, the gas passes to a cryogenic unit where methane, carbon monoxide if present, any excess nitrogen or re-cycled nitrogen necessary for ease of removing carbon monoxide, or methane, and some argon are removed to give the desired composition.

For hydrogen, molecular sieve beds may be used after the desired degree of shift and if desired, carbon dioxide removal, to produce pure hydrogen by pressure swing adsorption.

In the case of ammonia synthesis, carbon monoxide, methane and nitrogren can be recycled back to the secondary reformer or, particularly if argon is present, can be used as fuel.

For ammonia, the nitrogen may be substantially separated from the methane in the cryogenic unit in order that the methane when burnt should give a higher adiabatic flame temperature. This high temperature is important to effect a high transfer of heat in the radiant box section of the primary reformer.

The nitrogen stream leaving the cryogenic unit is split and part is recycled back to the cryogenic unit either directly (after recompression) or after use as a stripping gas, inasmuch as it is dry and cold, in the carbon dioxide removal unit. The recycled gas having stripped the carbon dioxide in order to make a lean solution to reduce the amount of carbon dioxide in the sweet gas is re-compressed and recycled to join up with the main feed to the $CO_2$ removal section, thus allowing a higher recovery of carbon dioxide than would otherwise obtain. This high recovery is important in the case of area production when the ammonia plant feedstock is natural gas. The non-recycled part of the nitrogen stream may be used as stripping or drying gas.

An advantage of recycling nitrogen is that such nitrogen does not introduce into the flowsheet additional argon. If the same quantity of nitrogen were added as air it would carry with it argon.

If the flowsheet does not contain a methanation unit, in order to produce a liquid nitorgen stream virtually free of carbon monoxide the cryogenic units's make-up gas stream or similar stream may be split and a part methanated, dried and returned to the cryongenic unit to effect the washing down of the final amounts of carbon monoxide which cannot be washed down with nitrogen in the cryogenic section.

Argon or an argon-rich stream may be recovered as a separate stream from the cryogenic unit. This may reduce the argon level in the synthesis gas. The argon level in the stream to the cryogenic unit may be allowed to increase by recyclng argon back to the reforming section.

A preferred embodiment of the invention for ammonia production would comprise desulphurising and then splitting the feed stream, bypassing some of the feed around the primary reformer and piping the bypassed feed, after heating it, directly to the secondary reformer, which may be two vessels, reforming the feed fed to the primary reformer according to conventional primary reforming art, shifting most of the carbon monoxide in high and low temperature shift reactors, removing carbon dioxide with a well known process such as Benfield or Selexol, methanating the stream and then passing the resultant gases to a cryogenic unit where methane, some argon and nitrogen are removed giving a synthesis gas containing some argon and methane.

The nitrogen/methane stream in the cryogenic unit is split to give a methane-rich stream which is used as fuel in the primary reformer and a nitrogen-rich stream which, after heating up to ambient temperature, is split again to give a nitrogen stream which represents the purging of excess nitrogen put in as excess air into the secondary reactor and along with which is purged some or all of the argon entering with the air (depending on whether a separate cryogenic loop purge unit is used), the remaining nitrogen is re-compressed and recycled to the cryogenic unit, the expansion of which at low temperature provides the refrigeration necessary to drive the cryogenic unit. After such expansion this stream joins the main feed to the cryogenic unit.

The pressure in the reforming section may be varied so as to adjust the power required by the air compressor and the synthesis compressor, as may the loop pressure.

The invention may also be used to produce hydrogen or reducing gas for metal ore reduction.

In the case of hydrogen production a preferred embodiment of the invention is: after desulphurisation to split the feed and bypass part of it around the primary reformer; add steam to the other part and reform it in the primary reformer in the normal manner; pipe the gases from the primary reformer to the secondary reformer to which compressed air or an oxygen-containing gas and the bypassed feed is also added; cool the gases from the secondary reformer; shift the carbon monoxide and then remove practically all the impurities from the hydrogen by using a pressure swing adsorption (PSA) unit well known to those familiar with the art. The purge gas from the PSA unit is used as fuel.

Alternatively, for hydrogen production, after the shift section, a carbon dioxide removal section to remove the bulk of the carbon dioxide is added to the above preferred embodiment.

There now follows a description of a preferred embodiment of the process. The streams numbered in the description below correspond to those on FIG. 1.

Natural gas is combined with recycle stream 3 and is desulphurised and then split into two parts giving streams 1 and 2 (shown on Table 1 without the addition of the re-cycle gas). Stream 1, the feed to the primary reformer is saturated with water in a saturator, leaving the saturator at 217° C. Such that the total feed to the primary reformer has the composition of stream 4. The gas leaves the primary reformer as stream 5 at a temperature of 813° C. and 32.1 kg/cm$^2$A. This stream 5, along with stream 2 and stream 7—the process air stream —are added together with supplementary process stream (stream 6) to the secondary reformer.

Stream 8 is the stream leaving the secondary reformer at 915° C. This stream is cooled by passing it through boilers down to 378° C. at which temperature it enters a high temperature shift reactor and then passes to a low temperature shift reactor which it leaves at 242° C. Having given up some of its heat between the high and low temperature shift reactors. The composition of the stream leaving the low temperature shift reactor is given as stream 9. The effluent from the low temperature shift is cooled to 40° C. by cooling water, and is then further cooled and enters a carbon dioxide removal unit, such as a Selexol unit. The stream leaving the carbon dioxide removal unit is at a temperature of −15° C. and has the flows given in stream 11. The carbon dioxide produce from the carbon dioxide removal section has the composition given in stream 12.

The carbon dioxide removal unit comprises three main sections, the absorber and a pressure let down system and ultimately a stripping unit wherein stream 16, derived from a downstream cryogenic unit, is used to strip the carbon dioxide from the recirculating physical solvent to a very low level. The gas leaving the top of the stripper has a composition and flow given in stream 10. This stream 10 is re-cycled back to the main absorber. The substantially $CO_2$ stream from the absorber (stream 11) is heated and passed to a methanator, the effluent from which has the composition of stream 13. From this stream 13 is taken the small re-cycle gas stream 3 mentioned above.

The methanator effluent (less stream 3) is combined with the purge gas taken from the synthesis loop and is fed to a cryogenic unit. This cryogenic unit separates the gases into: A. a make-up gas stream (15), B. a nitrogen-rich stream (16)—which, as mentioned above, is used in the $CO_2$ removal section, and C. a relatively methane-rich stream (17) which is used as fuel. After compression the make-up gas stream is added to gas re-cycled from the ammonia converter (stream 24) to give an ammonia converter feed (19). The converter effluent (stream 20) is cooled to $-18°$ C. whereupon ammonia (stream 22) condenses out and is separated from the gas. From the gas stream (21) a small purge stream (23) is taken whilst the majority of stream 21 is re-cycled as stream 24, as described above. The liquid ammonia is lowered in pressure and gases vented from it (stream 25) are utilised as fuel. The purge stream (23) taken from the gases leaving the separator is washed to extract the ammonia it contains and then the ammonia-free gases are separated into a purge gas stream (18) which is used as fuel and a re-cycle stream (14) which is combined with the feed to the cryogenic unit as described above. The final product ammonia is given as stream 26.

The energy needed to drive the cryogenic unit is obtained from three sources. Firstly the expansion of the liquid stream leaving the bottom of the distillation column in the cryogenic unit. Secondly the compressor compressing stream 16 effectively supplies energy for the cryogenic unit, but the majority of the energy before the end is supplied by a nitrogen refrigeration compressor which compressor operates an indirect refrigeration cycle.

A detailed description of the cryogenic unit is described in Air Products British Application filing Nos. 8236616 and 8311579.

I claim:

1. A process for the production of ammonia wherein excess nitrogen, introduced as air or an oxygen and nitrogen-containing gas, is fed to the secondary reformer, comprising dividing a hydrocarbon-containing feedstock into two parts, steam reforming one part in a tubular steam reformer and then adding to the effluent from the said reformer the other part of the feed, reforming the mixture with air or an oxygen-containing gas in a secondary reformer, cooling the resultant gases, passing these through a carbon monoxide shift section, removing carbon dioxide, methanating and passing the resultant gases into a cryogenic unit which produces:

(a) make-up gas suitable for compressing into an ammonia synthesis section;
   (b) a nitrogen-rich stream;
   (c) a methane-rich stream (i.e., methane-rich relative to the nitrogen-rich stream);

recycling a part of the nitrogen-rich stream to said cryogenic unit; and compressing the gas from (a) into an ammonia synthesis loop where liquid ammonia is produced.

2. A process as claimed in claim 1 wherein the part of the nitrogen-rich stream that is recycled is separately recompressed, cooled, expanded to product refrigeration, and then combined at low temperature with the main feed to the cryogenic unit.

3. A process as claimed in claim 1 wherein the part of the nitrogen-rich stream which is recycled is used as carbon dioxide stripping gas in a stripper which is part of the carbon dioxide removal section which is then compressed and recycled to combine with the main feed to the carbon dioxide removal unit and then passed back to the cryogenic unit as part of the main gas flow.

4. A process as claimed in claim 1 wherein the non-recycled part of the nitrogen-rich stream from the cryogenic unit is used to strip carbon dioxide in a stripper which is part of the carbon dioxide removal section.

* * * * *